US008093835B2

(12) United States Patent
Godbole et al.

(10) Patent No.: US 8,093,835 B2
(45) Date of Patent: Jan. 10, 2012

(54) LIGHT EMITTING DRIVER CIRCUIT WITH COMPENSATION AND METHOD

(75) Inventors: Kedar Godbole, San Jose, CA (US); Hariom Rai, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 679 days.

(21) Appl. No.: 12/238,655

(22) Filed: Sep. 26, 2008

(65) Prior Publication Data

US 2010/0079090 A1 Apr. 1, 2010

(51) Int. Cl.

*H05B 37/02* (2006.01)
*H05B 39/04* (2006.01)
*H05B 41/36* (2006.01)
*G05B 1/00* (2006.01)

(52) U.S. Cl. ......................... 315/307; 315/210; 315/291

(58) Field of Classification Search ........................ None
See application file for complete search history.

(56) References Cited

U.S. PATENT DOCUMENTS 7,550,934 B1 * 6/2009 Deng et al. .................... 315/308
7,583,244 B2 9/2009 Werner et al.
7,623,309 B2 * 11/2009 Hodkinson ..................... 360/25
7,675,487 B2 * 3/2010 De Oto ........................... 345/76
2006/0192728 A1 8/2006 Kim
2007/0004028 A1 1/2007 Lair et al.
2007/0262920 A1 * 11/2007 Werner et al. .................. 345/46
2008/0106217 A1 5/2008 Schindel et al.
2009/0174343 A1 * 7/2009 Lenz et al. .................... 315/292
2010/0060170 A1 * 3/2010 Nair ............................. 315/129

OTHER PUBLICATIONS

International Search Report of the International Searching Authority for International Application No. PCT/US09/58588 mailed Nov. 16, 2009; 2 pages.

The Written Opinion of the International Searching Authority for International Application No. PCT/US09/58588 mailed Nov. 16, 2009; 4 pages.

* cited by examiner

*Primary Examiner* — Douglas W Owens
*Assistant Examiner* — Dedei K Hammond

(57) ABSTRACT

A light emitting driver circuit, system, and method are provided. The driver circuit system and method can be implemented in various ways. An embodiment includes a bypass circuit which diverts current from the LEDs whenever a switch coupled to the LEDs incurs residual current when turned off. In an additional or alternative embodiment, the residual current can be sensed and the amount of residual current used to trigger fetching of a compensation value. That compensation value can change a dimming function forwarded to the switch in order to compensate for, offset, or substantially eliminate the residual current through that switch.

20 Claims, 4 Drawing Sheets

LIGHT EMITTING DRIVER CIRCUIT WITH COMPENSATION AND METHOD

TECHNICAL FIELD

This disclosure relates to electronic circuits and, more particularly, to driver circuits for light emitting devices.

BACKGROUND

Devices which emit light in response to current and/or voltage are generally referred to as light emitting devices. Although there are numerous types of light emitting devices, an LED is a popular example. As with most illumination applications, a light emitting device may be turned off or on periodically. Similarly, the light emitting device can also be partially turned on, or dimmed. In order to carry out the actuation or dimming features, many light emitting devices are controlled by a driver. That driver can be simple or complex depending on its function. The circuitry which makes up the driver can selectively apply power (i.e., voltage/current) to the light emitting device—either to turn on/off or dim the device. Residual power or current may still flow through the light emitting device even when turned off or substantially dimmed. Instead of the device providing no light, partial light may prevail due to the residual current leaking through the driver and thus the light emitting device. This occurrence may be compounded if the driver is temperature dependent. For example, when using a semiconductor switch such as a MOSFET, as the temperature increases, more residual leakage can occur through the light emitting device causing partial brightness when the device should be substantially dark as perceived by the user. Depending on the driver circuit performance, the on/off illumination ratio can be adversely affected.

DETAILED DESCRIPTION

Figure 1:
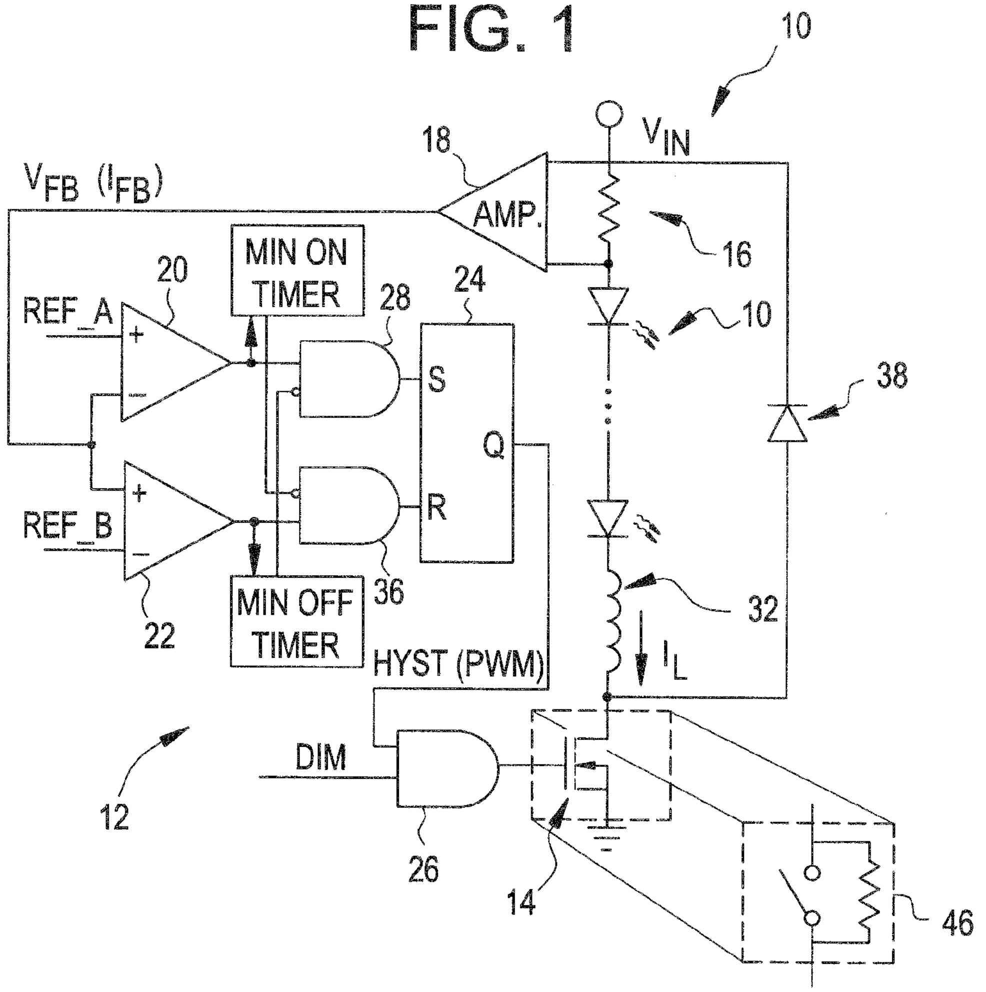
FIG. 1 is a circuit schematic diagram of an LED driver with LED current sensing, controlling and dimming functionality according to an embodiment.

According to one embodiment, a light emitting driver circuit is provided that can divert current from at least one light emitting device. That diverted current may be placed into a bypass circuit, where the bypass circuit may be placed in parallel with the light emitting device. In other words, whatever residual leakage current that might exist through the light emitting device as a result of the switch or drive source not completely turning off, is substantially removed from the light emitting device and diverted to a bypass circuit in lieu of the light emitting device.

In an embodiment a light emitting driver circuit is provided. The driver circuit can comprise a bypass circuit and a switch coupled to the bypass circuit. A logic circuit can be used to provide input to the switch, and can have a first input for receiving a series of pulses that control the average current through the switch, and a second input for periodically disabling the switch and forwarding substantially all of the residual current through the bypass circuit when the switch is disabled.

In another embodiment, the light emitting driver circuit can comprise a switched gain sense amplifier circuit for sensing current driven by the driver circuit with a multiplicity of gains. A logic circuit, or a software based algorithm may be used to decide which gain is used when the circuit is enabled, and when it is disabled by a signal applied to the logic circuit. A processor can be used for coupling to the sense circuit for determining a compensation value from the memory medium that will be used to substantially eliminate the effect of the residual current residing in the light emitting device. For example, if the effect is to emit a higher measurement of red color when using red colored light emitting devices, then the amount of pulses over a specified time duration would be modified to compensate for its effect. That amount or density (i.e., the width and quantity of pulses over a given time period) can be referred to as temporal density or simply "density." Removing the residual current will thus remove current from the light emitting devices when the switch is off.

A light emitting driver circuit is provided that preferably includes a bypass circuit, a switch, and a logic circuit. The switch is coupled to the bypass circuit, and the logic circuit can receive a first input and a second input, for example. The first input can be a series of pulses proportional to the current through the switch, and the second input can be used to periodically disable the switch and to forward through the bypass circuit substantially all current through the switch when the switch is disabled. The switch can be used to turn on and off one or more light emitting devices which can be coupled in series with that switch. A bypass circuit can be coupled in parallel with the light emitting devices, and the logic circuit can receive a second input for disabling the switch while forwarding any residual leakage current of the disabled switch through the bypass circuit rather than through the light emitting device.

An embodiment can also include a light emitting system. The system includes a switch and at least one light emitting device coupled to the switch. A bypass circuit is used to substantially divert current away from the light emitting device and through the bypass circuit when the switch is turned off, or disabled. The system includes at least one light emitting device, and can include multiple light emitting devices coupled in series or parallel, or multiple series-coupled devices connected in parallel with other series-coupled devices, or multiple parallel-connected devices connected in series with other parallel-connected devices, to form an array of light emitting devices between the switch and either a power supply or a ground supply.

A method for emitting light may substantially eliminate illumination from a light source when a switch is disabled. However, if residual current exists within the switch and the light source coupled to the switch when the switch is off, further elimination of illumination may be specified. Thus, the method further includes diverting residual current that exists within the disabled switch from the light source and into a bypass circuit. That bypass circuit can include a bypass conductor.

According to an additional or alternative embodiment, instead of diverting current from the light emitting device to a bypass circuit, the residual leakage current is measured or sensed and the driver circuit is controlled to take the residual current into account. In other words, the driver circuit includes a sense circuit also called a sense amplifier, and further processing circuits used to receive the sensed current, and forward a new value having a magnitude that will offset, negate, or substantially eliminate the residual current. The sense circuit may have one or multiple gain values, switchable via either logic or other interface, such as a microprocessor input/output (I/O) pin. This multiple sense circuit may be achieved, for example, by selecting a certain number of gain stages in the sense amplifier. Another technique to implement the switchable gain would be to selectively switch gain controlling elements in a one stage or multi-stage amplifier circuit.

The sense circuit is used for sensing the residual leakage current and controlling the leakage source so that substantially all of the leakage is eliminated. An embodiment can include a light emitting driver circuit comprising a sense circuit for sensing current driven by the driver circuit. The driver circuit can also include a processor coupled to the sense circuit, and a memory medium coupled to the processor. The processor can fetch from the memory a compensation value whose magnitude is sufficient to substantially eliminate any residual current residing in the sense circuit when such current should be at an absolute minimum. Thus, a light emitting system is contemplated comprising at least one light emitting device. A switch is used to selectively control current through the light emitting device. A sense circuit can sense current through the light emitting device and the switch. The processor can fetch a compensation value from memory and forward the compensation value to the switch to offset any residual current residing in the switch when the switch is disabled.

In an embodiment, a method is provided to reduce residual current within a light source by turning off the light source, yet sensing residual current through that light source. In response to sensing the residual current, a compensation value is fetched to offset or substantially eliminate the effect of the sensed residual current. The compensation value is forwarded to the driver circuit, and the compensation value is used to drive the light source so that the desired value of the current in the light emitting elements is achieved, including the residual current.

Turning now to the drawings, FIG. 1 illustrates at least one light emitting device (LED) 10 driven by a light emitting driver circuit 12 according to an embodiment. LED 10 can include one or more LEDs coupled in series with a switch 14, or a plurality of series-connected LEDs, or a plurality of LEDs in parallel, or a plurality of LEDs in a series-parallel or a parallel-series combination, coupled in series with switch 14. LED 10 includes any illumination device which responds to current and/or voltage. Switch 14 is part of driver circuit 12, and is used to enable or disable current ($I_L$) through the at least one LED 10. When placed in an "on" or "enabled" state, switch 14 implements a path, with a relatively small voltage drop or small resistance, between LED 10 and a supply voltage, such as ground in the example shown. When in the off or disabled state, switch 14 undergoes a relatively high resistance between LED 10 and the power supply or ground as shown. The difference in resistance between a low resistance on state and a high resistance off state can be generally a ratio of 1:100 or more.

The current ($I_L$) through LED 10 is regulated. Regulation is determined by measuring or sensing the voltage across resistor 16. That voltage is proportional to $I_L$ and is amplified by an amplifier 18, whose output is the feedback value ($I_{FB}$). Even though $I_{FB}$ is denoted as a "current" symbol, it is generally a voltage signal, but not necessarily so. The feedback value is compared to a reference voltage (REF_A, REF_B) within a lower limit comparator 20 and an upper limit comparator 22, respectively.

Figure 2:
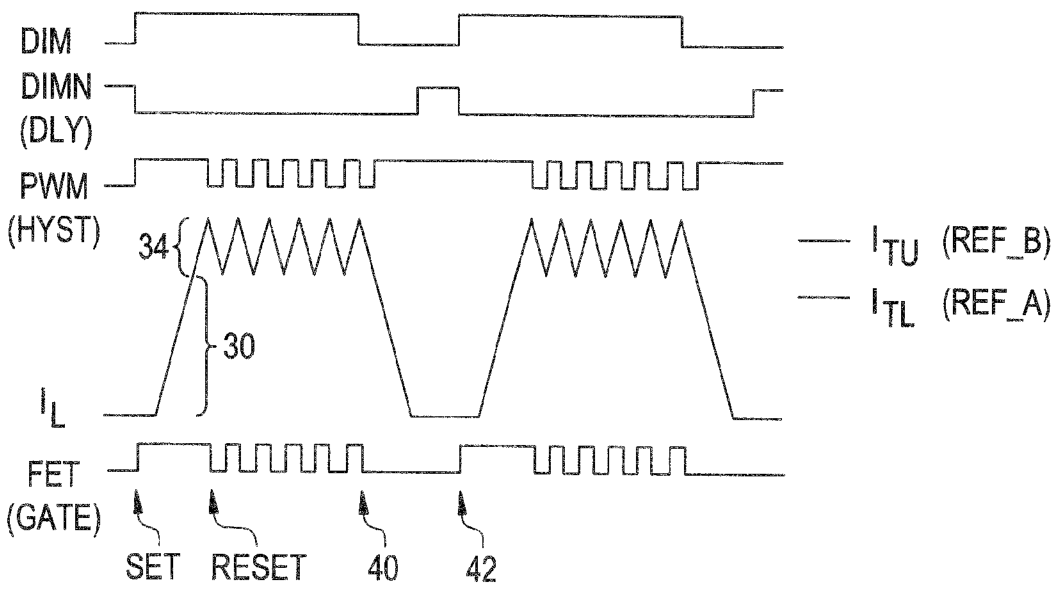
FIG. 2 is a timing diagram of various waveforms utilized by the LED driver according to an embodiment.

Driver 12 can be considered a hysteretic controller. As the sequence begins with current ($I_L$) at the 0 level as shown in the embodiment of FIG. 2, current is measured by the voltage across the sense resistors 16. With the dimmer signal (DIM) enabled at a logic 1 voltage value, the logic level from the latch 24 output is transmitted to the logic circuit 26. The lower limit comparator 20 compares the feedback signal ($I_{FB}$) and the reference voltage (REF_A) and produces an output that is sent to logic gate 28. As shown in the embodiment of FIG. 2, when the current is below a lower threshold 30, latch 24 is set and drives switch 14 to an on state. When switch 14 is on, the input voltage minus the drops in switch 14 and LED 10 appears across inductor 32, causing the inductor current ($I_L$) to ramp up 34 (FIG. 2). When the current ($I_L$) reaches the upper threshold ($I_{TU}$) (FIG. 2), then the upper limit comparator 22 output goes positive into logic gate 36, causing latch 24 to reset and drives the gate of switch 14 low. The gate of switch 14 goes low due to the HYST signal going low into logic circuit 26, which can be represented as an AND gate. All of the explanations in this document are written assuming positive logic. Similar implementations are possible with a negative logic system.

When the gate to switch 14 goes low, the inductor 32 voltage polarity reverses in an attempt to maintain the inductor current. This drives the voltage at the drain node of switch 14 to a relatively high voltage value. Diode 38 thereby becomes forward biased and turns on, and the current transfers through the diode, allowing the switch 14 current to substantially reduce to 0.

While the DIM signal is at a logic high voltage value, the current ($I_L$) through LED 10 extends upward, downward, and upward again between the upper and lower threshold values set by REF_A and REF_B as shown in FIG. 2. When the DIM signal goes low, the output from logic circuit 26 goes low irrespective of the current in the LED circuit, and the gate of switch 14 goes low and remains low even as the inductor current drops to a substantially low value. Switch 14 can be any switch which can trigger a high or low conductive state between terminals in response to a controlling terminal voltage. In an example, switch 14 can be a field-effect transistor, such as an N-channel metal oxide semiconductor (MOS) transistor. If switch 14 is an NMOS device, then a logic 0 voltage value upon the gate of switch 14 would cause a high resistance or low conductance state, thereby decreasing $I_L$ below the lower threshold, as shown at time 40 in FIG. 2. It is assumed that the drive strength of logic circuit 26 is adequate to drive the switch 14 in accordance with desired operational characteristics.

It is not until both DIM and HYST input signals to logic circuit 26 go high at time 42 (FIG. 2) will current $I_L$ ramp upward from a substantially 0 current level. Thereafter, the current will extend between the upper and lower current levels of the set thresholds. As the current modulates between the upper and lower thresholds, the hysteretic or other density function signal, such as PWM, will also modulate. The density function or temporal density function (TDF) is the density of the signal pulses, width, and/or quantity per unit of time. Accordingly, HYST can signify hysteretic control, pulse width modulation, or other density modulation functions. To implement dimming of the LED 10, a temporal density function is used to gate the operation of switch 14. The light output of LED 10 is essentially stopped by this temporal density function. Controlling the ratio of the time in which the density function is high or on, the time it is low or off, the average output of the LED is controlled. Since the human eye has a rather long time constant, the human eye averages this light output to interpret a control of the illumination intensity.

However, proper operation requires that LED 10 is properly off during the low period of the density function. If there is leakage in the switch 14 when switch 14 is gated off, switch 14 would provide a path for the current to excite LED 10 and cause a small amount of light to be output. That leakage can be modeled in the detailed view of leakage resistor 46. Resistor 46 is not necessarily an explicit component, but is simply a heuristic aid to model the imperfection of switch 14. Thus, instead of $I_L$ at the lowest point being equal to 0 (FIG. 2), $I_L$ can be at a current slightly above zero due to leakage within resistor 46. The light output during the off period may not be substantially zero—this would adversely affect the dimming ratio of the fully on and fully off ratio function. Added to the leakage might be a temperature-dependent operation of switch 14, in which an increase in temperature might increase the amount of residual current through the modeled resistor of switch 14 when switch 14 should be completely off, and no current flowing. In color-mixed applications, the temperature-dependent light may cause an error in the output color. For example, in the red-green-blue (RGB) color mixed application, an increase in red beyond that of green and blue or an increase in red, green, and blue, can disturb the proper ratio and cause a different resulting color to be presented rather than the desired color.

The current which resides within the switchable conductive path of switch 14 when switch 14 is gated off is hereinafter referred to as a "residual current." The residual current, while significantly small and usually in the sub-milliampere range, and possibly in the microamp range, still nonetheless exists even when, for example, the gate-to-source voltage of the n-type transistor of switch 14 is significantly below the turn off threshold. For example, the turn off threshold of an n-type transistor might be 0.2 volts, and the gate voltage relative to the grounded source might be below 0.2 volts, yet some residual current will flow between the drain and source even though the n-type transistor of switch 14 is off.

Figure 3:
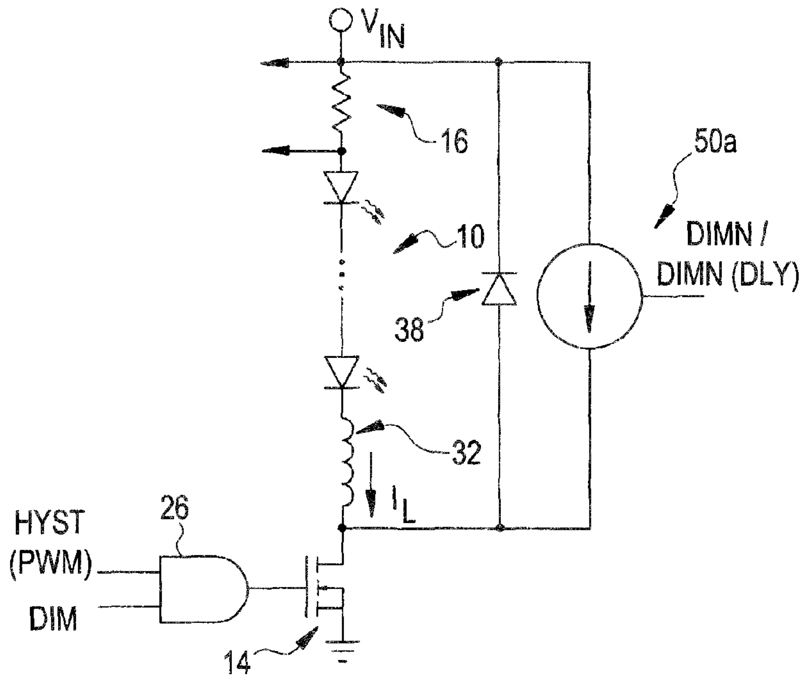
FIG. 3 is a circuit schematic diagram of an LED driver of FIG. 1 with an added bypass circuit to remove driver current leakage from the LEDs according to an embodiment.
Figure 4:
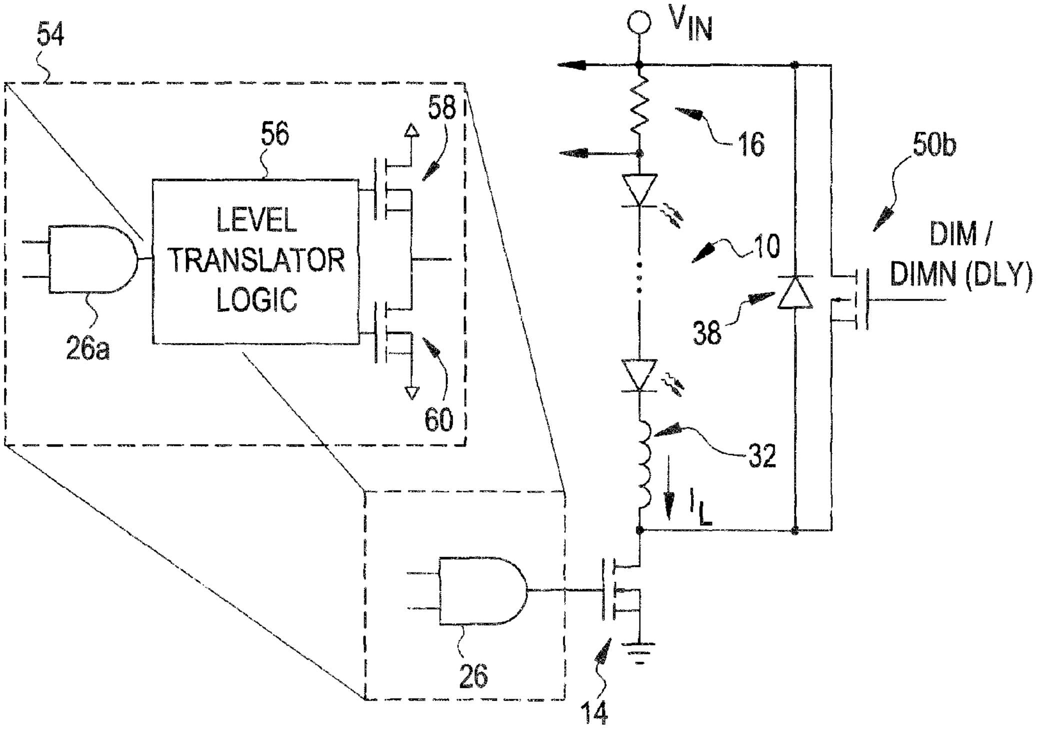
FIG. 4 is a circuit schematic diagram of an LED driver of FIG. 1 with an added switching circuit and/or a level translation circuit to remove driver current leakage from the LEDs and/or prevent leakage within the LED driver according to an embodiment.

FIGS. 3 and 4 illustrate two embodiments for diverting the residual current from LED 10. For sake of brevity, only a portion of driver circuit 12 (FIG. 1) are shown in FIGS. 3 and 4, yet it is understood that elements 20, 22, 24, 28, and 36 are present in the embodiments of FIGS. 3 and 4. FIGS. 3 and 4 illustrate two embodiments of a bypass circuit 50*a* and 50*b*, respectively.

In the embodiment of FIG. 3, bypass circuit 50*a* comprises a switchable current source, sometimes referred to as a "biased current source." Upon receiving either a DIM signal or a complementary DIM (DIMN) signal, depending on the desired logic state, current source 50*a* produces a constant current that will be designed to equal the residual current through switch 14 when switch 14 is off. That constant current can be modeled and designed as, for example, $(V_{IN}-V_{LED}-V_{R16})/R46$. Current source 50*a* thereby substantially bypasses LED 10 during the dimming time to allow an alternative path for the leakage in order to completely deplete any residual current from LED 10. This enhances the dimming ratio by minimizing any "glowing" LEDs. The constant current through current source 50*a* only appears during the dimming time, so presents minimal additional power dissipation across different temperature-dependent drive characteristics. It is also possible to construct a non-gated current source bypass path, which constantly delivers this current. While not preferred, due to excess energy loss, a non-gated current source can nonetheless be used.

Instead of using a switchable current source, the embodiment of FIG. 4 illustrates the use of switchable transistor 50*b*. For example, transistor 50*b* can use a PMOS device, such that when DIM signal goes low to turn off NMOS transistor 14, the same logic state can use used to turn on PMOS transistor 50*b*. Thus, transistor 50*b* is turned on only when the LEDs are to be turned off. This avoids cross conduction and provides the leakage current and the voltage at the drain of the NMOS transistor 14 to be raised to the VIN level, thereby preventing LED glow.

The size (i.e., channel area, gate area) of transistor 50*b*, as well as the size of various transistors which may make up current source 50*a*, can be relatively small especially if the residual current is small. If significant amounts of current exist when transistor 14 transitions off, the stored current in inductor 32 can be significant, and that current or, more particularly, the flipped voltage, can be significant as it is placed across the small devices of current source 50*a* and transistor 50*b*. While diode 38 will take over the stored current and the energy in the inductor will eventually be depleted in powering LEDs 10, it may be desirable to implement a delay in the enabling of current source 50*a* and transistor 50*b*. Referring to FIGS. 2, 3, and 4 in conjunction, the DIMN (DLY) is initiated after DIMN, complementary to DIM. Depending on the logic state desired, DIM (DLY) can also be used. However, regardless of the logic state, instituting a delay in the gating of current source 50*a* and transistor 50*b* allows the potential initial spike in current to be shunted by diode 38 before initiating the bypass conductor in a conductive state. While the optional delay may be used, it may not be used if the initial current spike can be handled by the bypass circuit.

Figure 6:
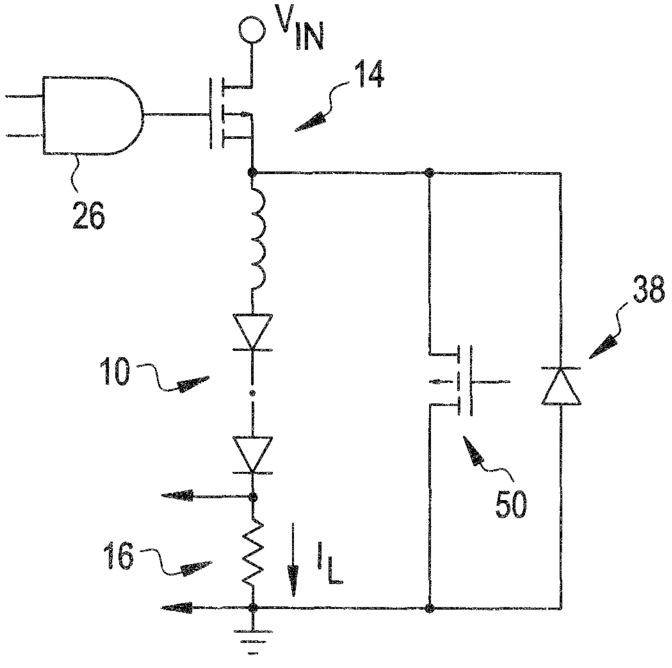
FIG. 6 is a circuit schematic diagram of the sense nodes placed near ground, rather than near the supply voltage according to an embodiment.

As a further alternative or option, instead of using a bypass circuit 50*a* or 50*b*, or in addition to using a bypass circuit 50*a* or 50*b*, a level translator 54 can be used (FIG. 4). Level translator 54 includes a logic circuit 26*a* (similar to logic circuit 26 in FIG. 1). Logic circuit 26*a* receives HYST and DIM inputs, and forwards the Boolean output to a level translator logic 56, when then places the output into a pull-up transistor 58 or pull-down transistor 60. In the embodiment of FIG. 4, pull-down transistor 60 is used to place the output from logic circuit 26*a* at a voltage level below the voltage on the source node of transistor 14. Thus, level translator 54 provides an output to the gate of transistor 14 that is below the source voltage of transistor 14, in order to ensure that transistor 14 is completely gated off. As shown in FIG. 6, for example, if transistor 14 is coupled to the greater power supply or VIN, then level translator 54 causes output of logic circuit 26*a* to be pulled upward by transistor 56 above VIN to ensure the VIN-coupled transistor 14 is gated completely off. Level translator 54 is used to drive the gate voltage below (in the case of an n-channel transistor 14) or above (in the case of a p-channel transistor 14 coupled to VIN) the source voltage of transistor 14. Level translation ensures inversion of the channel region and completes conversion so that the switch does not retain residual current and completely off.

Figure 5:
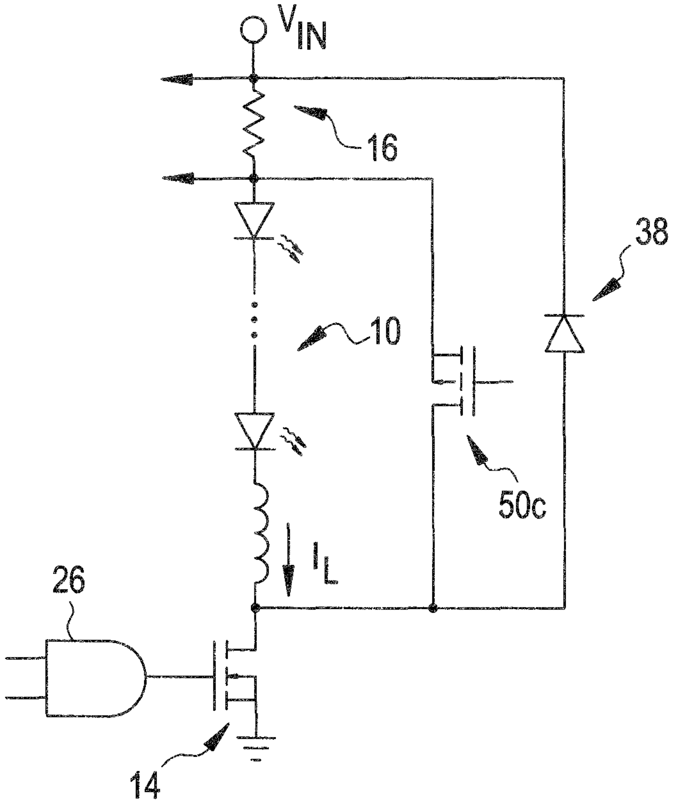
FIG. 5 is circuit schematic diagram of the added switching circuit placed solely across the LEDs instead of the sense nodes to remove leakage only from the LEDs according to an embodiment.

Turning to the embodiment of FIG. 5, it is understood that the bypass circuit 50*c* can be placed only across LEDs 10. By coupling the bypass circuit 50*c* in parallel with only the LEDs, the initial current of the stored inductive current ($I_L$) when DIM is enabled will be restricted by resistor 16 to somewhat protect the smaller devices of bypass circuit 50*c*. Therefore, FIG. 5 illustrates another embodiment useful in bypassing or diverting current from the LEDs when residual current exists within switch 14.

The embodiment of FIG. 6 illustrates a reversal or flipping of the LED, bypass, and switch arrangement of FIGS. 3 and 4, for example. Instead of coupling switch 14 to the lower supply voltage or ground (FIG. 5), switch 14 is coupled to the upper supply or power supply in the example of FIG. 6. Sense resistor 16 is coupled to ground, with LEDs 10 residing between switch 14 and sense resistor 16. Either arrangement of FIGS. 3 and 4 or FIG. 6 can be implemented depending on whether it is desired for using an n-type or p-type transistor for switch 14, as well as bypass circuit 50.

Figure 7:
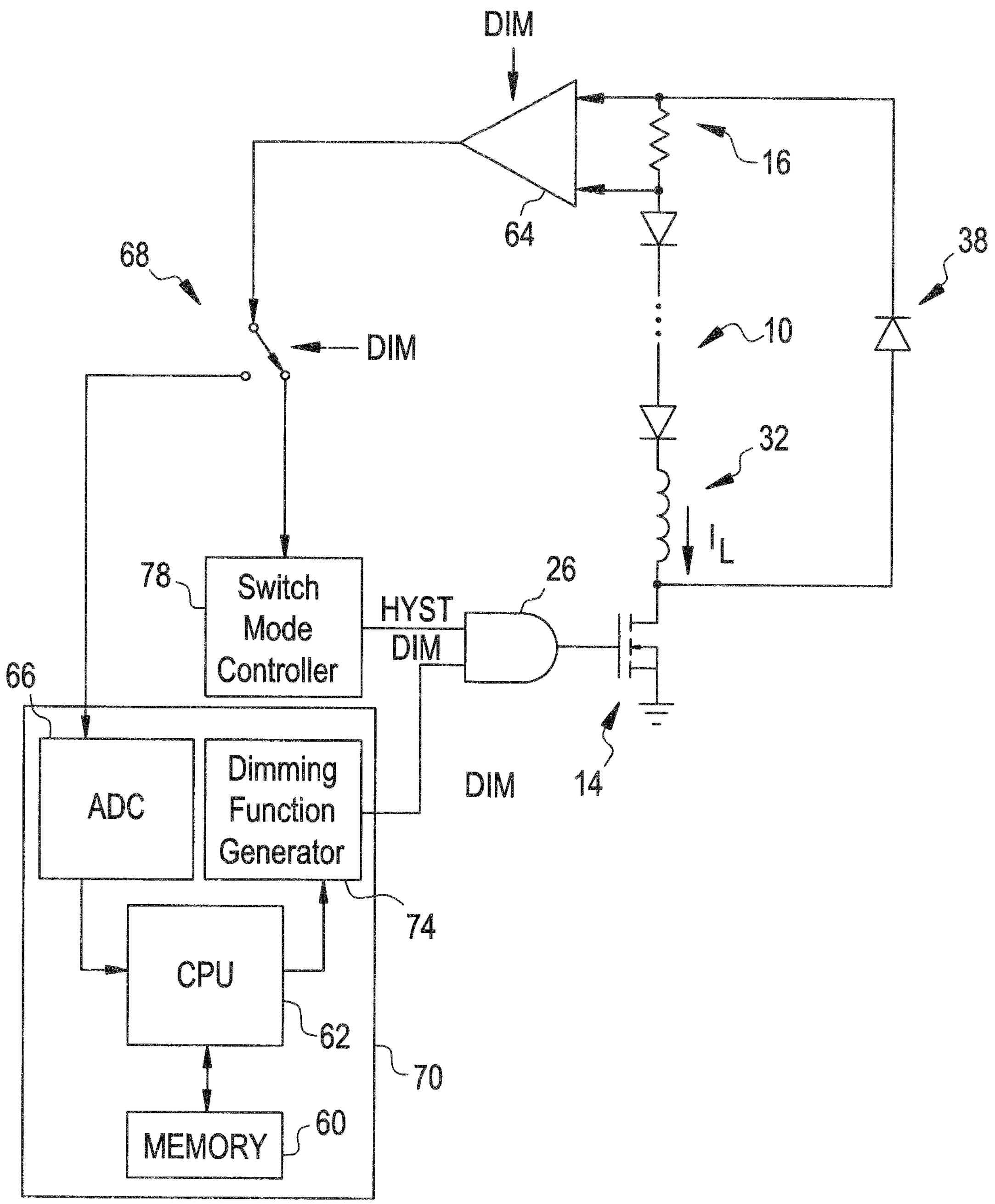
FIG. 7 is a circuit schematic diagram of an LED driver having a dimming circuit coupled to the sense nodes for programmably or programmatically offsetting or compensating for driver current leakage within the LEDs according to an embodiment.

Instead of bypassing of diverting the residual current, the embodiment of FIG. 7 illustrates a technique for sensing the residual current and compensating for that residual current by adjusting the dimming function. More specifically, the leakage through switch 14 is measured, and the temporal density function of the dimming signal is adjusted using compensation values stored within memory 60, and access by CPU or processor 62. The leakage is measured with a programmable gain current sense amplifier 64.

When in normal circuit operation with switch 14 on and current ($I_L$) within range 34 (FIG. 2), DIM used to switch amplifier 64 is at a logic high voltage value. Resulting from a DIM at a logic high value, current sense amplifier 64 is in a low gain state. However, when the dimming cycle occurs and DIM is at a logic low voltage value and $I_L$ drops to substantially 0 or at a residual current level, amplifier 64 is switched to a high gain state. The high gain output of amplifier 64 provides a measurement of the leakage or residual current to an analog-to-digital converter (ADC) 66 of compensation block 70.

ADC 66 receives the output, and switch 68 is toggled toward to ADC node when DIM is enabled or at a logic low voltage value. The digital representation output from ADC 66 is fed to CPU 62 which will then fetch from memory 60 the corresponding compensation value that will offset the read or sensed digitally converted voltage across resistor 16. The compensation value will be such that it substantially eliminates the effect of the excess of average value due to the residual current.

If normal operation occurs, then amplifier 64 produces a low gain output, which is switched to switch mode controller 78 via switch 68. Switch mode controller 78 provides the HYST signal along with the non-compensated DIM signal to logic gate 26. The PWM is a pulse width modulation density function derived from, for example, a delta-sigma or stochastic signal density modulation function. Amplifier 64 can have a differential voltage sensing function to monitor the LED current, and can have a programmable gain or multiplicity of selectable gains which can be used to measure and compensate for the effects of the leakage current. Amplifier 64 uses a switchable gain since the residual current through resistor 16 is fairly small, the high gain output is specified to be measured by ADC 66. The compensation value derived from, for example, look-up tables in memory 60, modify the duty cycle of the dimming pulse (DIM) to remove the effects of the leakage current on the LEDs.

It should be noted that switch 68 is an optional device. This may be eliminated by suitable design of the circuit components and/or additional devices such as voltage clamps. Similarly, it should be appreciated that in the foregoing description of exemplary embodiments of the invention, various features of the invention are sometimes grouped together in an embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A light emitting driver circuit, comprising:

a sense circuit to sense current driven by the driver circuit; and a processor coupled to the sense circuit to determine a compensation value to offset residual current residing in the sense circuit, wherein said sense circuit comprises a resistor coupled within the current path of the driver circuit, an amplifier coupled across the resistor and adapted to be triggered whenever the driver circuit is disabled, and a switch coupled between an output of the amplifier and an input of the processor to switchably place the sensed current into the processor for initiating said determining when the driver circuit is disabled.

2. The light emitting driver circuit as recited in claim 1, further comprising:

a switch coupled to the sense circuit to drive said current in the sense circuit when the switch is enabled and to drive said residual current in the sense circuit when the switch is disabled; and a logic circuit having a first input to receive a series of pulses proportional to said current and a second input coupled to an output of the processor to receive said compensation value.

3. The light emitting driver circuit as recited in claim 1, wherein said compensation value affects a pulse stream whose density in time is proportional to an amount of compensation needed to offset the effect of the said residual current.

4. The light emitting driver circuit as recited in claim 2, wherein said switch comprises a transistor having a selectable conduction path coupled to a ground supply or a power supply.

5. A light emitting system, comprising:

at least one light emitting device;

a switch to selectably control current through the light emitting device;

a sense circuit to sense current through the light emitting device and the switch;

a processor and memory coupled between the sense circuit and the switch to receive said sensed current, determine a compensation value stored in memory, and forward said compensation value to the switch to offset any residual current residing in the switch when the switch is disabled; and a logic circuit having a first input to receive a series of pulses proportional to said sensed current and a second input coupled to an output of the processor to receive said compensation value.

6. The light emitting system as recited in claim 5, wherein said switch comprises a transistor having a selectable conduction path coupled between the light emitting device and a ground, a lower potential supply, or a power supply.

7. The light emitting system as recited in claim 5, wherein the at least one light emitting device comprises a plurality of series-connected light emitting devices.

8. The light emitting system as recited in claim 5, wherein the at least one light emitting device comprises a set of series-connected light emitting devices coupled in parallel to form an array, or a parallel-connected light emitting devices coupled in series.

9. The light emitting system as recited in claim 5, wherein said sense circuit comprises:

a resistor coupled within the current path of the driver circuit; and an amplifier coupled between the resistor and the processor, the amplifier being adapted to send a signal to the processor to fetch the compensation value whenever the switch is disabled.

10. The light emitting system as recited in claim 5, wherein said compensation value comprises a pulse stream whose duty cycle is affected by an amount of compensation needed to offset the effect of the said residual current.

11. A method for reducing the effect of the residual current within a light source, comprising:

turning off the light source;

sensing residual current through the light source;

determining a compensation value to offset the effect of the sensed residual current; and forwarding the compensation value to a driver circuit used to drive the light source, wherein said compensation value affects a pulse stream whose density in time is proportional to an amount of compensation needed to offset the effect of the said residual current.

12. The method as recited in claim 11, wherein said turning off the light source comprises disabling the driver circuit while retaining said residual current through the driver circuit.

13. The method as recited in claim 11, wherein said sensing comprises amplifying the residual by a different gain current only during times when the light source is turned off.

14. The method as recited in claim 11, wherein said determining the compensation value whose magnitude is dependent on the sensed residual current.

15. A light emitting driver circuit, comprising:

a sense circuit to sense current driven by the driver circuit;

a processor coupled to the sense circuit to determine a compensation value to offset residual current residing in the sense circuit;

a switch coupled to the sense circuit to drive said current in the sense circuit when the switch is enabled and to drive said residual current in the sense circuit when the switch is disabled; and a logic circuit having a first input to receive a series of pulses proportional to said current and a second input coupled to an output of the processor to receive said compensation value.

16. The light emitting driver circuit as recited in claim 15, wherein said switch comprises a transistor having a selectable conduction path coupled to a ground supply or a power supply.

17. A light emitting driver circuit, comprising:

a sense circuit to sense current driven by the driver circuit; and a processor coupled to the sense circuit to determine a compensation value to offset residual current residing in the sense circuit, wherein said compensation value affects a pulse stream whose density in time is proportional to an amount of compensation needed to offset the effect of the said residual current.

18. The light emitting driver circuit as recited in claim 17, further comprising:

a switch coupled to the sense circuit to drive said current in the sense circuit when the switch is enabled and to drive said residual current in the sense circuit when the switch is disabled; and a logic circuit having a first input to receive a series of pulses proportional to said current and a second input coupled to an output of the processor to receive said compensation value.

19. A light emitting system, comprising:

at least one light emitting device;

a switch to selectably control current through the light emitting device;

a sense circuit to sense current through the light emitting device and the switch; and a processor and memory coupled between the sense circuit and the switch to receive said sensed current, determine a compensation value stored in memory, and forward said compensation value to the switch to offset any residual current residing in the switch when the switch is disabled;

wherein said compensation value comprises a pulse stream whose duty cycle is affected by an amount of compensation needed to offset the effect of the said residual current.

20. The light emitting system as recited in claim 19, wherein said switch comprises a transistor having a selectable conduction path coupled between the light emitting device and a ground, a lower potential supply, or a power supply.

* * * * *